(12) United States Patent
Hiranuma

(10) Patent No.: US 11,048,223 B2
(45) Date of Patent: Jun. 29, 2021

(54) MACHINE TOOL CONTROLLER AND MACHINE TOOL

(71) Applicant: FANUC CORPORATION, Yamanashi (JP)

(72) Inventor: Takuya Hiranuma, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/881,164

(22) Filed: May 22, 2020

(65) Prior Publication Data

US 2020/0387133 A1 Dec. 10, 2020

(30) Foreign Application Priority Data

Jun. 4, 2019 (JP) .............................. JP2019-104336
Jun. 21, 2019 (JP) .............................. JP2019-115593

(51) Int. Cl.
*B23Q 15/12* (2006.01)
*G05B 19/4093* (2006.01)
*G05B 19/402* (2006.01)

(52) U.S. Cl.
CPC ........... *G05B 19/402* (2013.01); *B23Q 15/12* (2013.01); *G05B 19/40932* (2013.01); *G05B 2219/49344* (2013.01)

(58) Field of Classification Search
None
See application file for complete search history.

(56) References Cited

U.S. PATENT DOCUMENTS

| 2010/0063608 | A1* | 3/2010 | Miller | G05B 19/409 |
| | | | | 700/97 |
| 2012/0222001 | A1* | 8/2012 | Nakai | G06F 8/34 |
| | | | | 717/110 |
| 2017/0308055 | A1* | 10/2017 | Hoshino | G05B 19/409 |
| 2019/0113903 | A1* | 4/2019 | Iijima | G05B 19/19 |
| 2019/0369592 | A1* | 12/2019 | Oonishi | G05B 19/402 |
| 2020/0285220 | A1* | 9/2020 | Saijo | G05B 19/41 |
| 2020/0379428 | A1* | 12/2020 | Hiranuma | G05B 19/40938 |

FOREIGN PATENT DOCUMENTS

JP 2003-202910 7/2003
JP 2004-268189 9/2004

* cited by examiner

*Primary Examiner* — Ryan A Jarrett
(74) *Attorney, Agent, or Firm* — Wenderoth, Lind & Ponack, L.L.P.

(57) ABSTRACT

A machine tool controller according to an aspect of the present disclosure controls a machine tool having a plurality of drive axes, the machine tool controller including: an input processing unit which displays an input screen including a schematic projection drawing of a driven body that is driven by the plurality of drive axes and an input box that allows for a positional relationship of the driven body in the schematic projection drawing to be inputted, and stores a numerical value inputted to the input box; a drawing information management unit which stores decoding information indicating a relationship between the numerical value inputted to the input box and a position or drive amount of the drive axis; and a parameter processing unit which converts the numerical value inputted to the input box into a drive parameter of the plurality of drive axes, based on the decoding information.

4 Claims, 4 Drawing Sheets

FIG. 3

| PARAMETER | | SAMPLE   N0000 |
|---|---|---|
| 19695 | 0.000 | |
| 19696 | RFC WKP   NPC   IA2 IA1<br>0  0  0  0  0  0  0  0 | |
| 19697 | TOOL PLUS DIREC.<br>0 | |
| 19698 | TILT ANGLE RA<br>0.000 | |
| 19699 | TILT ANGLE RB<br>0.000 | |
| 19700 | ROTARY TABLE POS X<br>0.000 | |
| 19701 | ROTARY TABLE POS Y<br>0.000 | |
| 19702 | ROTARY TABLE POS Z<br>0.000 | |
| 19703 | TABLE 1/2 OFFSET X<br>0.000 | |
| 19704 | TABLE 1/2 OFFSET Y<br>0.000 | |
| 19705 | TABLE 1/2 OFFSET Z<br>0.000 | |
| 19706 | 0.000 | |
| 19707 | 0.000 | |
| 19708 | 0.000 | |
| 19709 | TOOL/1 OFFSET X<br>0.000 | |
| 19710 | TOOL/1 OFFSET Y<br>0.000 | |
| 19711 | TOOL/1 OFFSET Z<br>0.000 | |
| 19712 | TOOL 1/2 OFFSET X<br>0.000 | |
| 19713 | TOOL 1/2 OFFSET Y<br>0.000 | |

A>_

MEM  * * ***    20:27:18

< | NO. SEARCH | ON: 1 | OFF: 0 | + INPUT | OUTPUT | | F INPUT | F OUTPUT | | | |

MACHINE TOOL CONTROLLER AND MACHINE TOOL

This application is based on and claims the benefit of priority from Japanese Patent Applications No. 2019-104336 filed on 4 Jun. 2019, and No. 2019-145593 filed on 21 Jun. 2019 the content of which is incorporated herein by reference.

BACKGROUND OF THE INVENTION

Field of the Invention

The present invention relates to a machine tool controller and a machine tool.

Related Art

Generally, a machine tool controller which controls a machine tool causes the machine tool to operate by following a machining program. With such a machine tool controller, it is necessary to set parameters which specify the mechanical configuration of the machine tool, as information serving as the basis of the machining operation. As such parameters, numerical information such as the movable range of each of a plurality of drive axes, and the relative positional relationship of each drive axis can be exemplified, for example.

In order to make such parameters easily settable, a parameter setting device for numerical control machines that displays a parameter setting screen in an interactive mode has been proposed (for example, refer to Patent Document 1).

Patent Document 1: Japanese Unexamined Patent Application, Publication No. 2003-202910

SUMMARY OF THE INVENTION

If using such technology as Patent Document 1 to set parameters by inputting the values of parameters in a form on a screen, it is possible to set the values of all of the parameters required. However, the ID (name of the parameter screen displayed) set in each parameter normally is defined as a combination of the meaning of this parameter, and a number for identification, and thus tends to be resembling character strings. For this reason, there is a risk of the operator making a mistake inputting the value of a parameter at the wrong position. Due to such a situation, a machine tool controller has been desired which allows for relatively simple and accurate setting of parameters.

A machine tool controller according to an aspect of the present disclosure controls a machine tool having a plurality of drive axes, in which the machine tool controller includes: an input processing unit which displays an input screen including a schematic projection drawing of a driven body that is driven by the plurality of drive axes and an input box that allows for a positional relationship of the driven body in the schematic projection drawing to be inputted, and stores a numerical value inputted to the input box; a drawing information management unit which stores decoding information indicating a relationship between the numerical value inputted to the input box and a position or drive amount of the drive axis; and a parameter processing unit which converts the numerical value inputted to the input box into a drive parameter of the plurality of drive axes, based on the decoding information.

According to the machine tool controller of the present disclosure, it is possible to relatively easily and accurately set parameters.

BRIEF DESCRIPTION OF THE DRAWINGS

FIG. 3 is a view exemplifying a parameter input screen of the machine tool controller in FIG. 1.

DETAILED DESCRIPTION OF THE INVENTION

Figure 1:
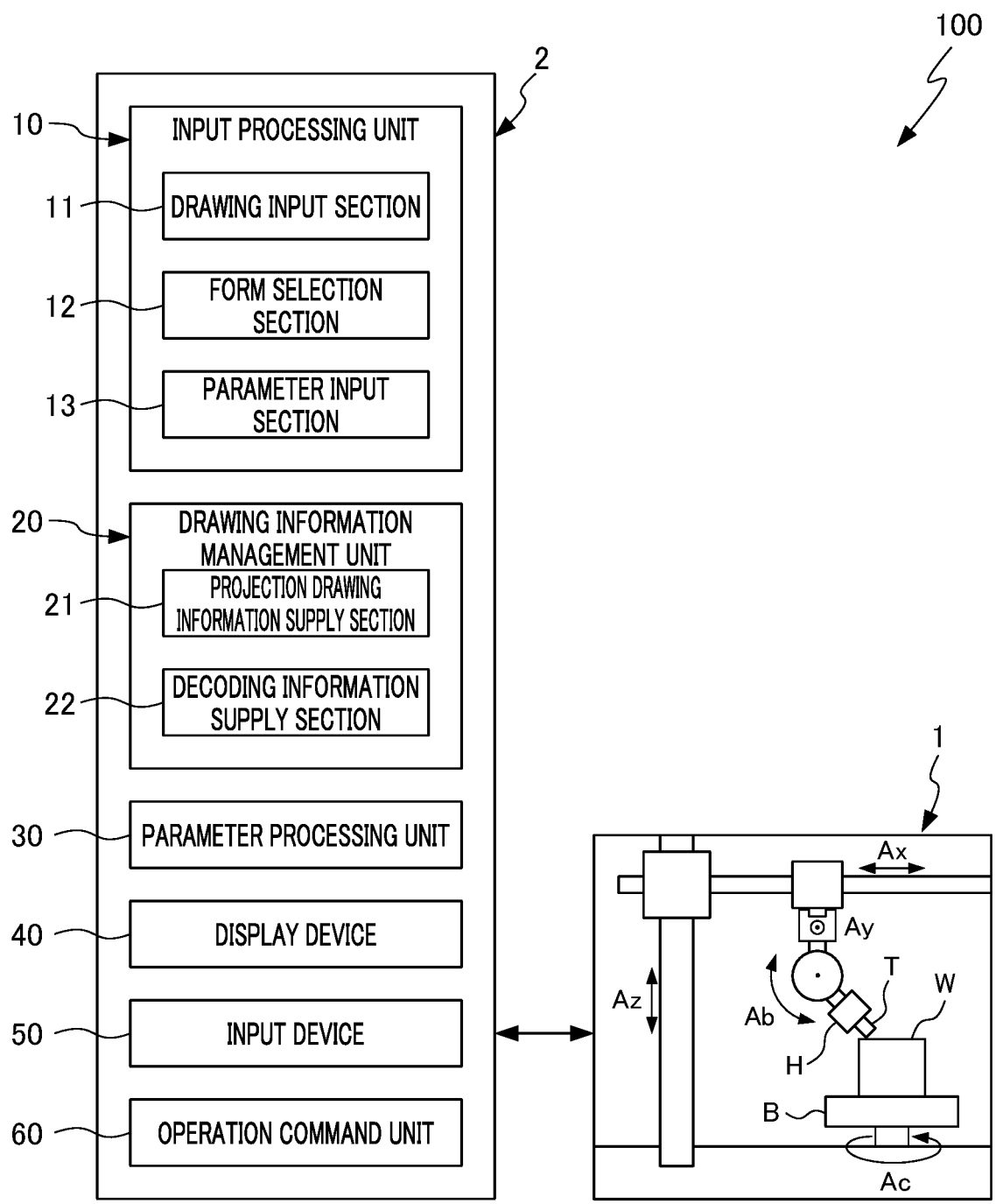
FIG. 1 is a block diagram showing the configuration of a machine tool according to an embodiment of the present disclosure.

Hereinafter, an embodiment of the present disclosure will be explained while referencing the drawings. FIG. 1 is a block diagram showing the configuration of a machine tool 100 according to an embodiment of the present disclosure. The machine tool 100 includes a machining device 1 having a plurality of drive axes, and a machine tool controller 2 which controls the machining device 1. The machine tool controller 2 is an embodiment of the machine tool controller according to the present disclosure.

The machining device 1 can be established as a device which cuts a workpiece W retained on a table B, for example, by way of a tool T retained in a machining head H, and has a plurality of drive axes which can relatively move the tool T (machining head H) in relation to the workpiece W (table B). The specific axis configuration of the machining device 1 is not particularly limited; however, as an example, the machining device 1 can be established as a 5-axis machining device having, as the plurality of drive axes, the three orthogonal linear motion axes Ax, Ay, Az, a rotary axis Ab which is parallel to the linear motion axis Ay, and a rotary axis Ac which is parallel to the linear motion axis Az. In the machining device 1, the table B and machining head H are driven bodies which are driven by the drive axes Ax, Ay, Az, Ab and Ac.

The machine tool controller 2 controls the respective drive axes Ax, Ay, Az, Ab and Ac of the machining device 1. This machine tool controller 2 can be realized by installing an appropriate control program in a computer device having a CPU, memory, etc. This machine tool controller 2 may be configured by a numerical controller installed to the machining device 1. In addition, the machine tool controller 2 has a part or the entirety thereof provided separately from the numerical controller of the machine tool controller 2, and may be configured by a management server which manages one or a plurality of numerical controllers, for example. In addition, the machine tool controller 2 may have a part or the entirety thereof jointly used by a plurality of machine tools.

The machine tool controller 2 includes: an input processing unit 10 which displays the schematic projection drawing of the driven bodies B and H and allows numerical value to be inputted on a schematic projection drawing; a drawing information management unit 20 which stores decoding information showing the relationship between numerical values inputted to the input processing unit 10 and the position or drive amount (change amount, speed, etc.) of drive axes; a parameter processing unit 30 which converts the numerical values inputted to the input processing unit 10 into drive parameters based on the decoding information stored by the diagram information management unit 20; a display device 40 and input device 50 controlled by the input processing unit 10; and an operation command unit 60 which gives operation commands to the machining device 1 so as to perform machining designated by the machining program according to the drive parameters calculated by the parameter processing unit 30.

The input processing unit 10 has a drawing input section 11 which causes to be displayed, on the display device 40, a projection drawing input screen including: a schematic projection drawing D of driven body models Mb, Mh simplifying the driven bodies G, H, respectively, a plurality of input boxes T1, T2, T3 . . . Tn (n is a positive integer) allowing the positional relationship in the schematic projection drawing D to be inputted by a numerical value using the input device 50, and auxiliary lines L1, L2, L3 . . . Ln indicating the position or dimension corresponding to the respective input boxes T1, T2, T3 . . . Tn; and stores the numerical values inputted in the respective input boxes T1, T2, T3 . . . Tn.

In addition, the input processing unit 10 further has a form selection section 12 that accepts the input of form selection information designating at least any of the configuration of the plurality of drive axes Ax, Ay, Az, Ab and Ac of the machining device 1, and viewpoint of the schematic projection drawing D displaying on the drawing input section 11.

The drawing input section 11 preferably illustrates on the schematic projection drawing D the control point P serving as the reference for the position of at least either of the driven body models Mb and Mh, and the respective drive axes Ax, Ay, Az, Ab and Ac. The distance and reference of position that should be inputted in the input boxes T1, T2, T3 . . . Tn thereby become clear.

In addition, the drawing input section 11 attaches to the schematic projection drawing D the input boxes T1, T2, T3 . . . Tn allowing the numerical values required for specifying the positional relationship of the driven bodies G and H indicated by the drive body models Mb, Mh to be inputted, based on the format information provided from the drawing information management unit 20, and the auxiliary lines L1, L2, L3 . . . Ln indicating the distance corresponding to the numerical values that should be inputted in the input boxes T1, T2, T3, on the schematic projection drawing D of the driven body models Mb, Mh. Furthermore, the drawing input section 11 preferably further attaches to the schematic projection drawing D the coordinate information which can specify the viewpoint of the schematic projection drawing D of Mb and Mh.

As the numerical values allowed to be inputted to the input boxes T1, T2, T3 . . . Tn, it is possible to establish as the distance between the control point P and table B, the maximum operation range of the control point P, distance from the control point P of the drive axes Ax, Ay, Az, Ab, Ac, etc., when all of the drive axes Ax, Ay, Az, Ab, Ac are at the origin. By allowing this information to be inputted in a plurality of schematic projection drawings having different start points, it becomes possible to calculate the 3-dimensional offset of the drive axes Ax, Ay, Az, Ab and Ac. The drawing input section 11 stores the ID of the input boxes T1, T2, T3 . . . Tn and the corresponding values inputted into the input boxes T1, T2, T3 . . . Tn to be associated one-to-one.

Figure 2:
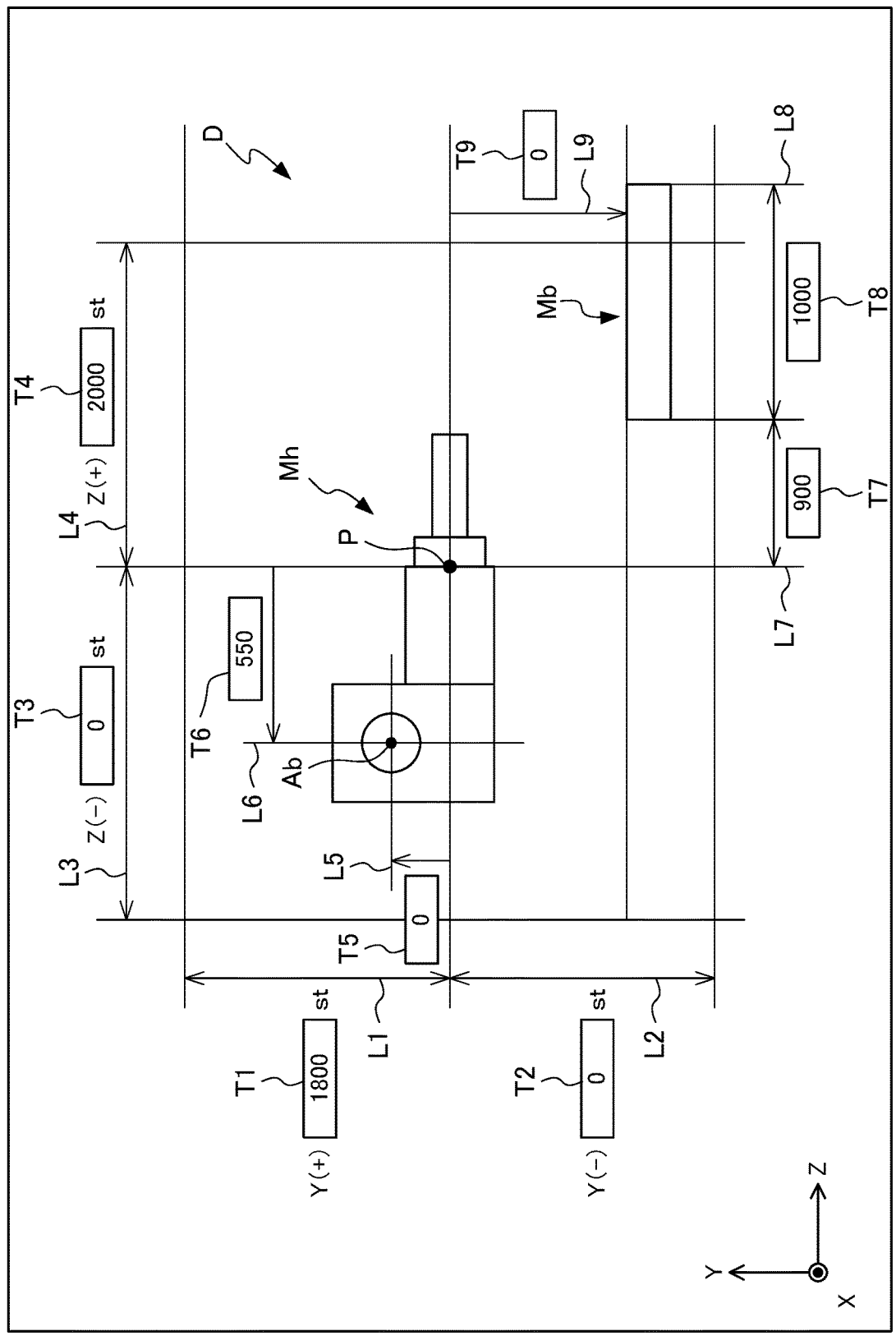
FIG. 2 is a view exemplifying a projection drawing input screen of the machine tool controller in FIG. 1.

The auxiliary lines L1, L2, L3 . . . Ln can be illustrated by a method using dimension lines and dimension auxiliary lines of a format conforming to the drawing rules stipulated in ISO129-1 or the like, for example. In addition, the coordinate information can be displayed in any format such as a projection drawing of arrows of unit length indicating the direction of each axis of XYZ in the schematic projection drawing D, as exemplified in FIG. 2.

The form selection unit 12 accepts input of form selection information specifying the format information supplied to the drawing input section 11 from the drawing information management unit 20. The form selection information accepting input by the form selection unit 12 includes at least one of axis configuration information specifying the axis configuration of the machining device 1, and viewpoint selection information specifying the viewpoint of the schematic projection drawing D displayed by the drawing input unit 11. In the case of the machining device 1 and machine tool controller 2 corresponding one-to-one, the form selection unit 12, if not accepting input of axis configuration information, may be configured so that the format information of the axis configuration set in advance is supplied to the drawing input unit 11. In addition, the form selection unit 12 may perform display of a pull-down menu, for example, in order to select the viewpoint of the schematic projection drawing D from a plurality of viewpoints set in advance.

The input processing unit 10, as exemplified in FIG. 3, may further include a parameter input unit 13 which displays a parameter input screen allowing numerical values of drive parameters specifying the position or drive amount of the drive axes Ax, Ay, Az, Ab, Ac to be inputted, similarly to conventional. The parameter input unit 13 may make the parameter input screen usable in order to confirm the value of a drive parameter obtained by the parameter processing unit converting the numerical value inputted by way of the drawing input unit 11.

The drawing information management unit 20 has a projection drawing information supply section 21 which supplies to the input processing unit 10 the format information specifying the projection drawing input screen that should be displayed by the drawing input unit 11; and a decoding information supply section 22 which supplies to the parameter processing unit 30 the decoding information corresponding to the input screen displayed by the input processing unit 10 and the axis configuration of the machining device 1.

The projection drawing information supply section 21 supplies to the input processing unit 10 information for appropriately displaying image data of the schematic projection drawing D of the driven body models Mb, Mh corresponding to the format selection information set in advance or inputted to the form selection section 12; as well as the corresponding input boxes T1, T2, T3 . . . Tn and auxiliary lines L1, L2, L3 . . . Ln. For this reason, the projection drawing information supply section 21 stores data of the driven body models Mb, Mh of all selectable axis configurations. Herein, the projection drawing information supply section 21 may store the driven body models Mb, Mh as 3-dimensional data, and generate image data of the schematic projection drawing D from the selected viewpoint each time; however, in the case of the viewpoint of the schematic projection drawing D being selected from a plurality of viewpoints set in advance, it may store image data of the projection drawing of the driven body models Mb, Mh from selectable viewpoints as data of the driven body models Mb, Mh.

The projection drawing information supply section 21 may change the positions of the driven body models Mb, Mh in the schematic projection drawing D based on the numerical values inputted in the input boxes T1, T2, T3 . . . Tn, or the drive parameters calculated by the parameter processing unit 30. When inputting numerical values into the input boxes T1, T2, T3 . . . Tn, or when displaying schematic projection drawings D having different viewpoints, it becomes easier for the operator to notice a mistake in numerical value inputted into the input boxes T1, T2, T3 . . . Tn.

The decoding information supply section 22 supplies to the parameter processing unit 30 the decoding information indicating the relationship between the numerical values inputted in the input boxes T1, T2, T3 . . . Tn, and the drive parameters specifying the position or movement amount of the drive axes Ax, Ay, Az, Ab, Ac, based on the form selection information. In the case of the drive direction of a drive axis being parallel to the coordinate axis of the schematic projection drawing D, the value inputted to one input box and one drive parameter will correspond. In this case, the decoding information indicating this relationship becomes a constant of proportionality. In addition, in the case of the drive direction of the drive axis not being parallel to the coordinate axis of the schematic projection drawing D, the values inputted to a plurality of input boxes correspond to one or a plurality of drive parameters. In this case, the decoding information indicating this relationship becomes a numerical formula.

Figure 4:
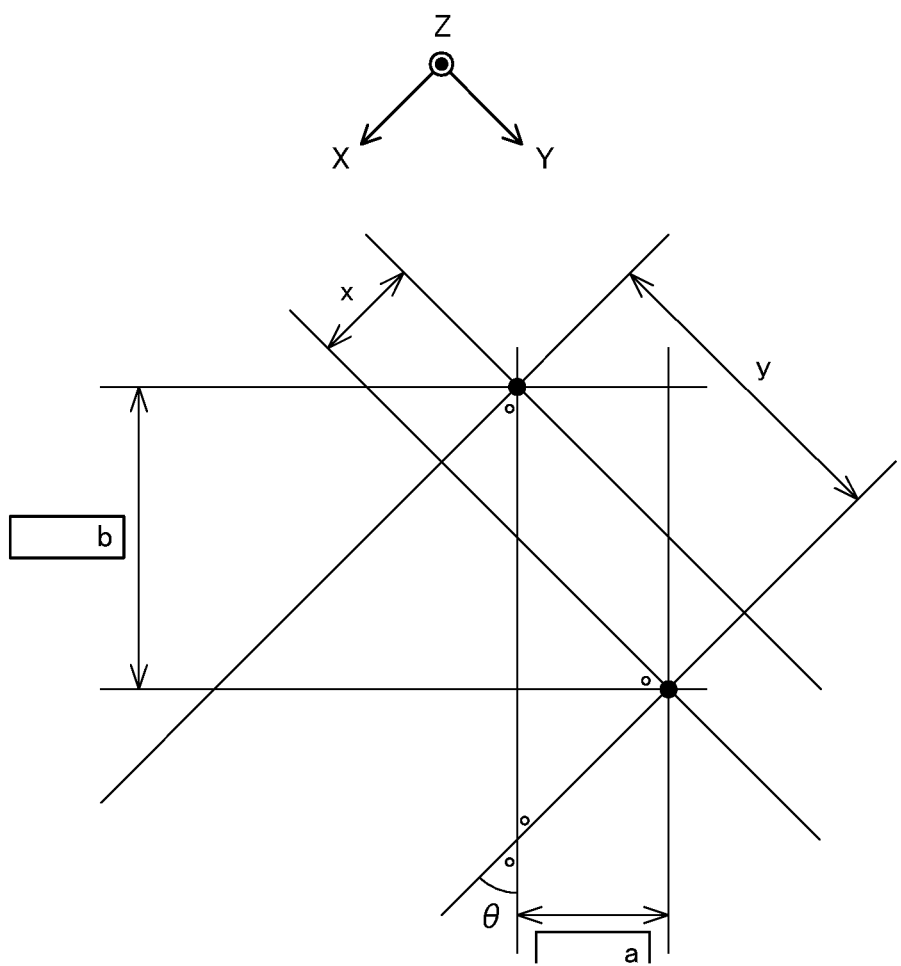
FIG. 4 is a view explaining an example of decoding information of the machine tool controller in FIG. 1.

FIG. 4 shows a case of the horizontal direction and vertical direction of the schematic projection drawing D sloping by an angle el relative to the X direction and Y direction of the machining device 1. When establishing the input value of the input box T1 inputting the distance in the horizontal direction of the schematic projection drawing D as "a", and establishing the input value of the input box T2 inputting the distance in the vertical direction as "b", the drive amount x in the drive axis Ax in the corresponding X direction and the drive amount y of the drive axis Ay in the corresponding Y direction can be respectively calculated as $x=\cos(\theta)*(b-a*\tan(\theta))$ and $y=a/\cos(\theta)+\sin(\theta)*(b-a*\tan(\theta))$. Therefore, the decoding information supply section 22 supplies to the parameter processing unit 30 these calculation formulae as decoding information. In addition, in the case of the angle a in the XY plane being inputted to the input box of the schematic projection drawing D, the decoding information supply section 22 can be established as a configuration supplying to the parameter processing unit 30 the calculation formulae for calculating the vector $\cos(\alpha)$ in the X axis direction and the vector $\sin(\alpha)$ in the Y axis direction as drive parameters, from the inputted numerical value $\alpha$.

The parameter processing unit 30, based on the decoding information supplied from the decoding information supply section 22, specifies the drive parameters of the drive axes Ax, Ay, Az, Ab, Ac from the numerical values inputted to the input boxes T1, T2, T3 . . . Tn.

The display device 40 is a device in which the display control unit displays the projection image of the driven body models Mh, Mb, or input screen, and can be configured by a liquid crystal display panel, organic EL display panel or the like, for example.

The input device 50 is a device which inputs information to the input processing unit 10, and can be configured by a keyboard, mouse, touch sensor or the like, for example. In addition, the display device 40 and input device 50 may be configured integrally as in a touch panel, for example.

The operation command unit 60 analyzes a machining program, determines the operation of each drive axis Ax, Ay, Az, Ab, Ac at conditions according to drive parameters calculated by the parameter processing unit 30, and inputs to the machining device 1 a command signal which designates operation of each drive axis Ax, Ay, Az, Ab, Ac.

The machine tool controller 2, upon the operator inputting a drive parameter necessitated in order to control the machining device 1, causes a schematic projection drawing D of the same viewpoint as the drawing of the machining device 1 to be displayed by the input processing unit 10, and can allow drive parameter to be accurately inputted by configuring so as to be able to input dimensions on the drawing as is in the input boxes T1, T2, T3 . . . Tn. For this reason, it is not necessary for the operator to do a complicated calculation, and the possibility of mistaking the input box to input a numerical value is also low; therefore, it is possible to make the appropriate settings of drive parameters relatively easily. In particular, by being able to display the schematic projection drawing D of the same viewpoint as the drawing possessed by the operator by way of the form selection unit, setting of accurate parameters is possible easily.

Although an embodiment of the present disclosure has been explained above, the present disclosure is not to be limited to the aforementioned embodiment. In addition, the effects described in the present embodiment are merely listing the most favorable effects produced from the present disclosure, and the effects from the present disclosure are not limited to those described in the present embodiment.

The machine tool controller according to the present disclosure may be a configuration in which the input processing unit does not have a form selection section. In this case, the drawing information processing unit of the machine tool controller may be configured so as to store only information of one type of axis configuration corresponding to a connected machining device, and supply format information of a plurality of projection drawing input screens having different viewpoints of schematic projection drawings to the input processing unit in a predetermined order.

EXPLANATION OF REFERENCE NUMERALS 100 machine tool
1 machining device
2 machine tool controller
10 input processing unit
11 drawing input section
12 form selection section
13 parameter input section
20 drawing information management unit
21 projection drawing information supply section
22 decoding information supply section
30 parameter processing unit
40 display device
50 input device
60 operation command unit

What is claimed is:

1. A machine tool controller which controls a machine tool having a plurality of drive axes, the machine tool controller comprising:
   an input processing unit which displays an input screen including a schematic projection drawing of a driven body that is driven by the plurality of drive axes and an input box that allows for a positional relationship of the driven body in the schematic projection drawing to be inputted, and stores a numerical value inputted to the input box;
   a drawing information management unit which stores decoding information indicating a relationship between the numerical value inputted to the input box and a position or drive amount of the drive axis; and a parameter processing unit which converts the numerical value inputted to the input box into a drive parameter of the plurality of drive axes, based on the decoding information.

2. The machine tool controller according to claim 1, wherein the input processing unit has a form selection section which accepts input of form selection information specifying at least either one of a configuration of the plurality of drive axes and a viewpoint of the schematic projection drawing, and wherein the drawing information management unit supplies, to the input processing unit, information of the schematic projection drawing corresponding to the form selection information inputted to the form selection section, and supplies, to the parameter processing unit, the decoding information corresponding to the form selection information inputted to the form selection section.

3. The machine tool controller according to claim 2, wherein the drawing information management unit supplies image data of the schematic projection drawing to the input processing unit.

4. A machine tool comprising:
the machine tool controller according to claim 1; and
a plurality of drive axes which is controlled by the machine tool controller.

* * * * *